Sept. 29, 1970  J. B. EHRET  3,530,685
RETAINER-SEAL FOR GEAR TYPE FLEXIBLE COUPLINGS
Filed Sept. 24, 1968  2 Sheets-Sheet 1
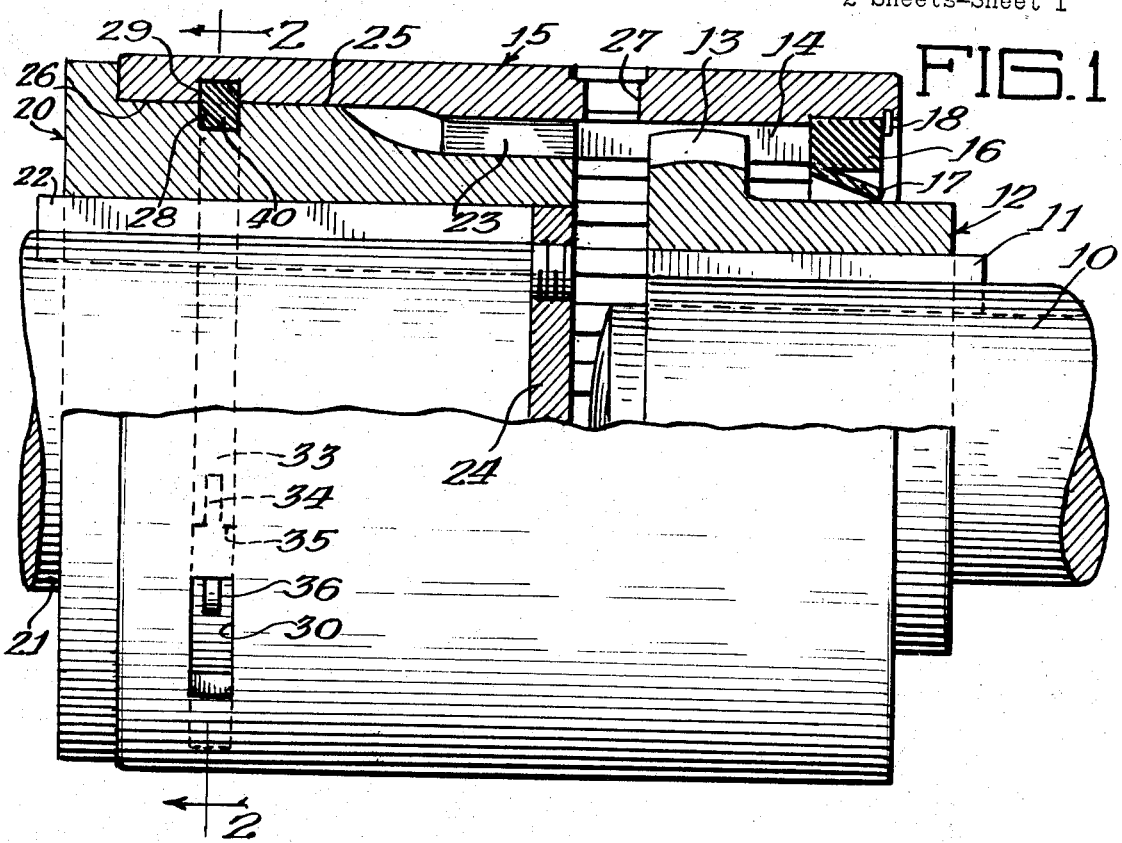
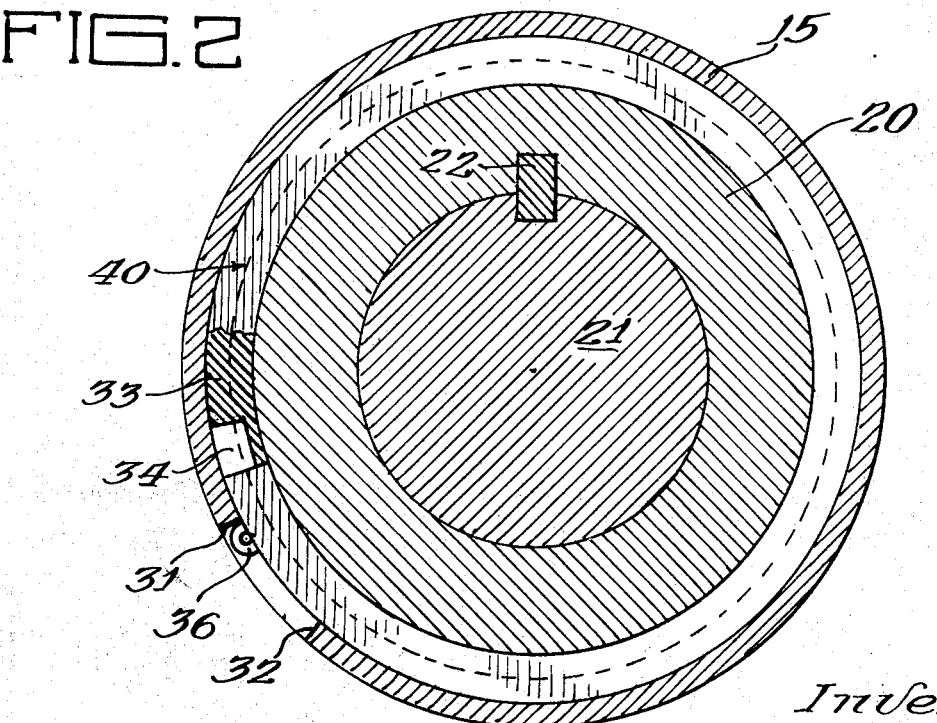
Inventor:
John B. Ehret
By: Hofgren, Wegner, Allen,
Stellman & McCord
Attorneys

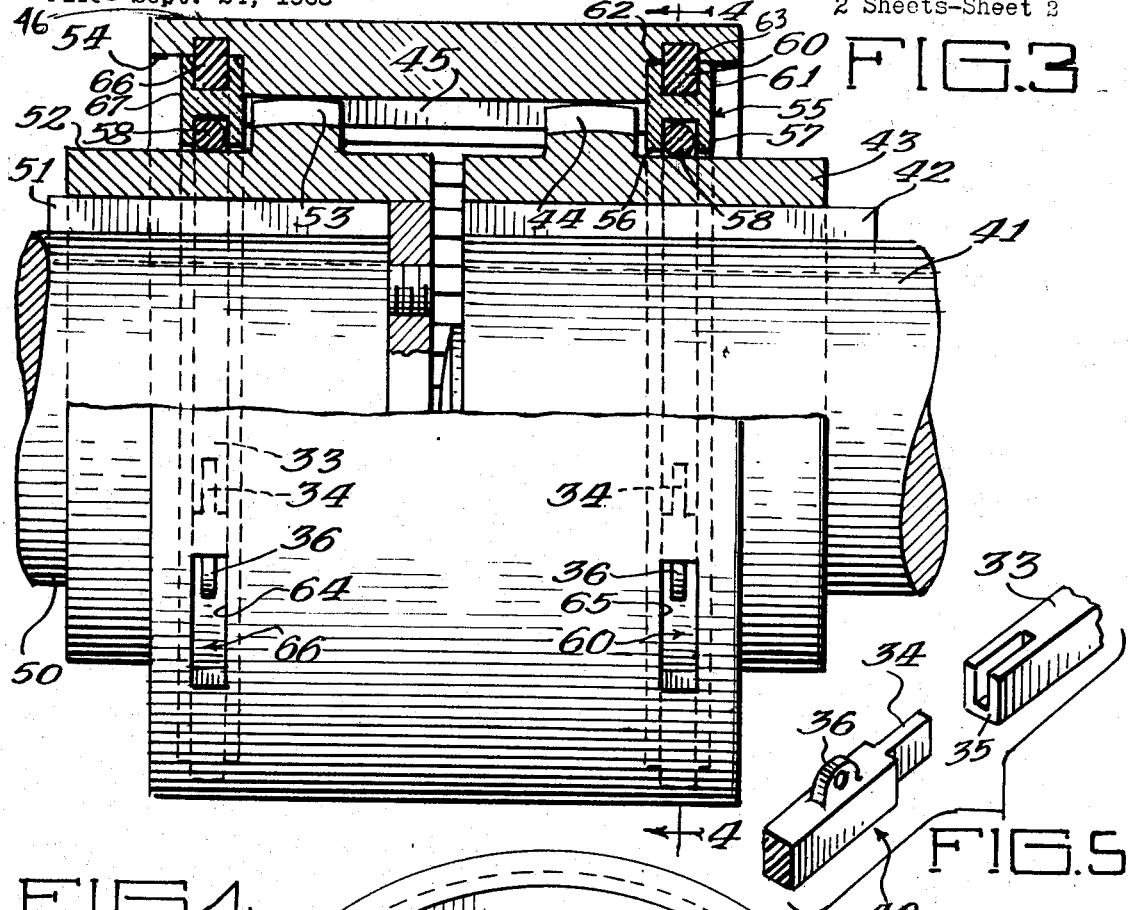
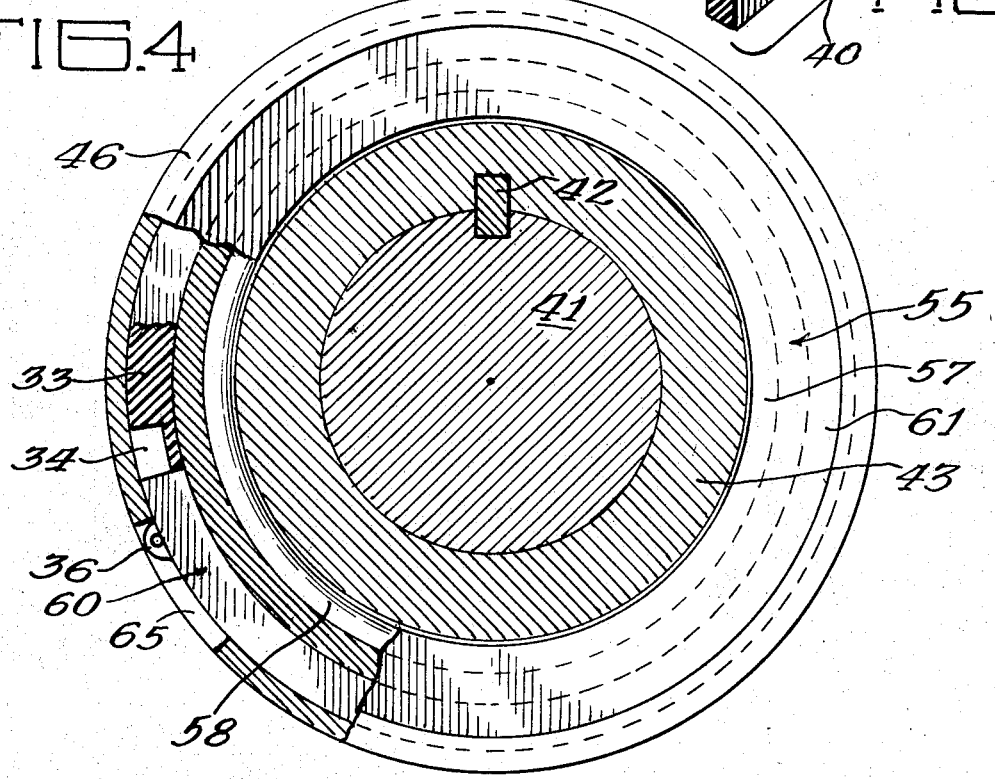

United States Patent Office 3,530,685
Patented Sept. 29, 1970

3,530,685
RETAINER-SEAL FOR GEAR TYPE FLEXIBLE COUPLINGS
John B. Ehret, 20860 Greenwood Drive,
Olympia Fields, Ill. 60461
Filed Sept. 24, 1968, Ser. No. 761,968
Int. Cl. F16c *1/06;* F16d *3/18*
U.S. Cl. 64—4                                       8 Claims

ABSTRACT OF THE DISCLOSURE

A retainer for securing gear type coupling sleeves and hubs together against endwise separation. A key of flexible material such as nylon, polyurethane or other plastic which has physical characteristics that permit the key to be pushed endwise through an exterior opening in the coupling sleeve into a key-way groove between the coupling parts, and to be pulled out of the groove when desired. The key fills the groove, has ends mated, and acts as a key and a seal against loss of lubricant from within the coupling parts.

BACKGROUND OF THE INVENTION

Field of the invention

This invention relates to seals and retainers in couplings for rotating shafts accommodating misalignment, particularly gear type couplings with myriad uses including drives between motors and driven elements. A great many such couplings are used in steel mills, rolling mills, strip treating lines and general power transmission systems.

Description of the prior art

In steel mills, spindles with flexible couplings at each end are used to connect the mill rolls with the driving gear reducers or motors. The type of coupling is as shown in its major parts in FIGS. 1 and 2 of the drawings herein. These couplings have used a steel waffle spring to retain the coupling parts together, the spring being so named because of its undulating appearance. The steel waffle spring has proven difficult to insert because the application of pushing force can cause the spring to buckle and break at one of the high or low points of the wave shape. Repeated buckling has resulted in failure during removal when the spring is in tension. This can occur without contributory rusting. The wave shape of the waffle spring also permits the entry of foreign matter such as dirt and mill scale which further contributes to binding of the spring in the mating grooves and results in the necessity of applying excessive force, causing breakage when trying to pull the spring out. The springs are also subject to rusting and often break in the groove between the coupling parts, making it practically impossible to extract them. In such instances, the steel mill personnel generally use an oxyacetylene torch to burn the coupling in two rather than delay the continued production of the rolling mill involved. A new coupling has to be substituted in such instances, resulting in considerable expense.

All couplings of the gear type have parts which may be subject to conditions of atmosphere and surroundings which can cause split rings or waffle springs to deteriorate and cause difficulty when it is desired to disassemble the coupling for maintenance or changes. It is for these problems that the present invention provides a solution.

A general disclosure of the known gear type couplings may be obtained from the following United States patents: 2,510,414, R. S. Philbrick, June 6, 1950; 2,918,809, R. A. Miller, Dec. 29, 1959; 2,974,501, S. S. Kaufman et al., Mar. 14, 1961; 3,174,302, A. W. Pomper, Mar. 23, 1965; 3,313,124, L. Filepp, Apr. 11, 1967.

SUMMARY OF THE INVENTION

The present invention is directed to the utilization of a plastic key in a mating groove in a gear type coupling wherein the key can be inserted endwise and extracted by endwise pull; and even should such key break, another key of similar section may be used to push the broken part out of the groove, thereby maintaining the coupling always in a condition to be assembled and disassembled. Further, the key is so made that it may provide a seal against the loss of lubricant from within the coupling, eliminating the necessity for additional separate seals.

DESCRIPTION OF THE DRAWINGS

FIG. 1 is a quarter sectional broken view through a spindle coupling embodying the present invention.

FIG. 2 is a sectional view through the coupling of FIG. 1 taken substantially along the line 2—2 therein.

FIG. 3 is a view similar to FIG. 1 of another coupling form utilizing the present invention.

FIG. 4 is an end elevational view, partially broken away, of the coupling shown in FIG. 3.

FIG. 5 is a broken perspective view of one of the useful forms of mating ends of the key member utilized in the present invention.

The structure of the coupling is a spindle which is shown in FIGS. 1 and 2. The main components are machined from forged-steel components. The spindle shaft 10 will have a duplicate coupling on its right-hand end at the triving motor or gear reducer (not shown), the coupling shown in FIGS. 1 and 2 being at the driven instrumentality. The shaft in commercial spindles may vary between a little over 1″ in diameter to over 20″ in diameter.

The spindle shaft 10 has a key 11 coupling the same into a hub 12. This hub is equipped with gear teeth 13 in mesh with teeth 14 internally formed in a sleeve 15. A heavy rubber seal 16 has a lip 17 for retaining lubricant within the coupling, the seal is held in place by a split ring retainer 18 engaging a groove in the sleeve. A second hub 20, sometimes referred to in the industry as an "adapter," is intended to connect to a shaft 21 of driven equipment as by key 22. The hub 20 also has spline teeth 23 in mesh with a continuation of the teeth 14 in a sleeve so that the hub and sleeve will turn together. A thrust plate 24 is pressed into the end of hub 20, and receives forces from any floating motion of shaft 10 and hub 12.

An outer surface 25 of the hub is machined so as to have a slip fit with the inner surface 26 of the sleeve placed thereover, the clearance in an approximately 3″ size being of the order of slightly less than .010″. The space between the hub within the coupling and around the gear teeth may be filled with grease through a fitting 27.

In order to secure the sleeve and hubs together, a groove is formed between the parts to receive a retainer. The groove in the instant case is quadrilateral in section, having one-half formed in the hub 20 and one-half formed in the sleeve 15. In FIG. 1, it may be noted that U-shaped walls 28 in the hub 20 are positioned opposite U-shaped walls 29 in the sleeve which, when together, may result in a substantially square groove which, for example in a 3″ size spindle shaft coupling, would result in a groove approximately ¼″ wide and ¼″ in radial depth.

Access to the groove formed by the walls 28 and 29 is through an opening 30 in the sleeve generally of the width of the groove and having end walls 31 and 32 which may be about 23–25° in circumferential length apart. A key 40 of plastic material, so that it is elongated and flexible, is insertable through the opening 30 by endwise progressive pushing of the key into the groove. One end of the key is started in through the opening 30 and eventually will find its way around the coupling to again appear in the opening 30, and the trailing end will match the same so that the key substantially completely fills the groove so provided. As shown in FIGS. 1 and 2, the first end inserted in the opening is the end 33 which has a groove into which a tongue 34 on the trailing end may fit with the surfaces 35 of the two ends abutting in a plane across the key, thus providing a seal against the loss of lubricant by centrifugal action from within the coupling. An upstanding ear 36 may be provided with a hole crosswise so that the key may be grasped with a wire tool to move it within the groove and to aid extraction. Ordinarily, it is preferred to move the joined ends of the key in under solid metal of the sleeve.

The retainer key 40 may be formed of various plastic materials, a polyurethane and a nylon having been found satisfactory. There is not a great deal of end thrust on the retainer when in place and the choice of materials may vary with the atmospheric conditions and the temperature, surrounding corrosive dust and abrasive conditions in which the coupling must operate, as well as the centrifugal force to which the coupling will be subjected, tending to throw lubricant out of the coupling. Softer materials provide a better seal. It is believed that retainer keys of plastics may be satisfactory within a tensile strength varying from 4,500 p.s.i. to 11,800 p.s.i. Ultimate elongation at break point may vary as much as from 60% to 650%. The hardness of softer materials found satisfactory may be as low as 80 on the Shore A-scale. Some harder plastic materials have been satisfactory up to 120 on the Rockwell R-scale. The modulus of elasticity may vary widely. An example of a nylon material by Du Pont found satisfactory is that designated by the trade name "Zytel 101"; an example of a polyurethane material found satisfactory is that by Mobay Chemical Company under the designation "Texin 335D". Obviously, other plastic materials having similar physical characteristics may be employed.

Referring to FIGS. 3 and 4, a slightly different gear type coupling may utilize the retaining key of this invention to advantage. Herein, a driven shaft 41 is keyed at 42 into a hub 43 in which gear teeth 44 mesh with teeth 45 on a continuous outer sleeve 46. Shaft 50 is likewise keyed at 51 to a hub 52 also having teeth 53 in mesh with the teeth 45 of the sleeve.

The assembly of coupling hubs and sleeves is accomplished in a fashion to seal lubricant within the coupling and to keep the parts of the coupling in proper position for power transmission. Similar structure is used between the sleeve and each hub. Referring to the right-hand end of FIG. 3, a 360° continuous metallic or plastic ring 55 having the shape of a capital H in section forms a support for the key retainer. The H-shaped ring has clearance with the coupling parts so as to be easily positioned between them. Between the legs 56 and 57 on the I.D. of the ring is placed an O-ring seal 58 so that lubricant will not pass the I.D. of the ring and to permit flexing between the hub and ring. A plastic key retainer 60 occupies the space between the legs 61 and 62 on the O.D. of the metallic ring as well as a groove 63 formed on the interior of the sleeve by U-shaped walls quite similar to those of groove 29 in the sleeve 15 in FIG. 1. In cases involving higher centrifugal forces, the H-shaped ring may have its O.D. provided with a press fit with the inner surface 54 of the sleeve to aid the sealing function of the key retainer.

The plastic key retainer 60 is the same in structure as the key retainer 40 previously described. An opening 64 or 65, as the case may be, is provided in the sleeve for progressive pushing of the key retainer into the groove provided by the sleeve and the metallic ring. Retainer-seal 66 is a duplicate of the retainer-seal 60 and is in a groove formed by the metallic ring 67 and walls in the sleeve as in the case of the metallic ring 55 and retainer-seal 60.

Couplings of the gear type may be required to be disassembled at intervals for maintenance, replacement or changes in the drive or driven members. The present key retainers may be easily extracted from their position in the grooves, the plastic having a low coefficient of friction with the forged-steel parts of the couplings. In the event that a portion of the key retainer might be broken from the remainder, it can be driven out of the groove by another key of similar size threaded through the opening in the sleeve and into the groove. Generally, the principle embodied in FIG. 3 using the H-ring, O-ring and retainer seal can be applied to retaining and joining other mechanical devices such as bearings, shafts, etc.

The foregoing detailed description has been given for clearness of understanding only, and no unnecessary limitations should be understood therefrom, as some modifications may be obvious to those skilled in the art.

I claim:

1. In a gear type flexible coupling adapted to compensate for misalignment of and transmission of power between rotating shafts, such coupling having a sleeve part and hub parts for such shafts, means for retaining sleeve and hub parts in position for transmission of power, comprising:

at least one elongated flexible key having a generally uniform cross-sectional shape, said key being formed of solid plastic material;

means forming at least one annular groove between such parts to be retained in position, such groove being so positioned as to be separated intermediately upon endwise separation of such coupling parts, such groove having walls forming a generally uniform cross-sectional shape mating the cross-sectional shape of said key; and means forming an opening through the exterior of the sleeve extending lengthwise of the groove a few degrees and at least of the groove width, said opening providing access for the key to be endwise progressively inserted into the groove to extend 360° about the coupling parts thereby retaining such coupling parts against endwise separation, said key having mating ends positionable within said groove.

2. Means for retaining flexible coupling parts together as specified in claim 1 wherein the flexible key has interfitting and mating end portions joinable within the confines of said groove walls through the opening in said sleeve through which the key is inserted in said annular groove, said mating ends being movable with the entire key in the groove to a position under the sleeve part to retain said ends in mating relationship.

3. Means for retaining flexible coupling parts together as specified in claim 1 wherein the flexible key has interfitting and mating end portions joinable within the confines of the opening in said sleeve through which the key is inserted in said annular groove wherein the flexible key has an outwardly extending ear upstanding from the end of the key last to be inserted in the groove, said ear reposing in said opening in said sleeve providing means for grasping the key during endwise progressive removal of the key from said groove.

4. Means for retaining flexible coupling parts together as specified in claim 1 wherein the flexible key has interfitting and mating end portions joinable within the confines of the opening in said sleeve through which the key is inserted in said annular groove wherein the walls forming the groove are substantially quantitatively one-half in the sleeve and one-half in the hub and in a part of the sleeve closely surrounding the hub.

5. Means for retaining flexible coupling parts together as specified in claim 1 wherein the flexible key has interfitting and mating end portions joinable within the confines of the opening in said sleeve through which the key is inserted in said annular groove wherein the walls forming the groove are partially in said sleeve and in a metallic ring abutting said sleeve and hub so that the key in said groove retains the hub and sleeve against endwise separation.

6. Means for retaining flexible coupling parts together as specified in claim 1 wherein the flexible key has interfitting and mating end portions joinable within the confines of the opening in said sleeve through which the key is inserted in said annular groove wherein the key has interfitting end surfaces joinable within the groove through the confines of said opening through the sleeve to said groove and the key is shaped and of a length to substantially fill the groove providing a barrier against passage of lubricant past the key and thus out of the coupling.

7. In a device having a sleeve part and an annular part to be retained in position in the sleeve part, means for retaining the sleeve part and annular part together in operative position, comprising:
  at least one elongated flexible key having a generally uniform cross-sectional shape, said key being formed of solid plastic material;
  means forming at least one annular groove between such parts to be retained in position, such groove being so positioned as to be separated intermediately upon endwise separation of such sleeve and annular parts, such groove having walls forming a generally uniform cross-sectional shape mating the cross-sectional shape of said key;
  means forming an opening through the exterior of the sleeve extending lengthwise of the groove a few degrees and at least of the groove width, said opening providing access for the key to be endwise progressively inserted into the groove to extend about the annular part thereby retaining such sleeve and annular parts against endwise separation; and
  said key having mating end portions so positioned as to mate within the confines of said annular groove whereby the key and groove walls cooperatively form a 360° uninterrupted seal and retainer about said parts retained in desired position.

8. In a gear type flexible coupling adapted to compensate for misalignment of and transmission of power between rotating shafts, such coupling having a sleeve part and hub parts for such shafts, means for retaining sleeve and hub parts in position for transmission of power, comprising:
  at least one elongated flexible key having a generally uniform cross-sectional shape, said key being formed of solid plastic material;
  means forming at least one annular groove between such parts to be retained in position, such groove being so positioned as to be separated intermediately upon endwise separation of such coupling parts, such groove having walls forming a generally uniform cross-sectional shape mating the cross-sectional shape of said key;
  a metallic ring reposing between each hub and the sleeve, each ring having a cross-sectional H-shape with a seal within the legs of the H-shape adjacent the hub, said flexible key reposing between the legs of the H-shape adjacent the sleeve and in the adjacent sleeve part; and
  means forming an opening through the exterior of the sleeve extending lengthwise of the groove a few degrees and at least of the groove width, said opening providing access for the key to be endwise progressively inserted into the groove to extend 360° about the coupling parts thereby retaining such coupling parts against endwise separation, said key having mating ends positionable within said groove.

References Cited

UNITED STATES PATENTS

| 2,458,714 | 1/1949 | Mahoney. | |
| 2,772,550 | 12/1956 | Harrington | 64—4 |
| 3,045,453 | 7/1962 | Shenk et al. | 64—9 |
| 3,298,198 | 1/1967 | Winkler | 64—9 |
| 3,429,448 | 2/1969 | Rosell | 285—321 X |

JAMES A. WONG, Primary Examiner

U.S. Cl. X.R.

64—9; 285—321